(12) United States Patent
Shen et al.

(10) Patent No.: US 6,529,709 B1
(45) Date of Patent: Mar. 4, 2003

(54) CLOSED LOOP POWER CONTROL SCHEME FOR WIRELESS COMMUNICATION SYSTEMS

(75) Inventors: Qiang Shen, Nepean (CA); Witold A. Krzymien, Edmonton (CA)

(73) Assignee: Telecommunications Research Laboratories, Edmonton (CA)

( * ) Notice: Subject to any disclaimer, the term of this patent is extended or adjusted under 35 U.S.C. 154(b) by 974 days.

(21) Appl. No.: 08/696,247

(22) Filed: Aug. 13, 1996

(30) Foreign Application Priority Data

Aug. 12, 1996 (CA) ............................................ 2183139

(51) Int. Cl.[7] .......................... H04B 7/185; H04B 1/00; H04B 7/00
(52) U.S. Cl. ........................................ 455/69; 455/13.4
(58) Field of Search ................................ 455/38.3, 38.1, 455/13.4, 68–69, 571–574, 230, 283, 297–298, 501, 504

(56) References Cited

U.S. PATENT DOCUMENTS

| | | | | |
|---|---|---|---|---|
| 4,177,430 A | * | 12/1979 | Paul ........................... | 455/306 |
| 4,811,421 A | * | 3/1989 | Havel et al. ................ | 455/504 |
| 5,192,918 A | * | 3/1993 | Sugiyama ................... | 455/306 |
| 5,305,468 A | | 4/1994 | Bruckert et al. .............. | 455/69 |
| 5,345,598 A | * | 9/1994 | Dent ............................ | 455/69 |
| 5,485,486 A | * | 1/1996 | Gilhousen et al. ............ | 455/69 |
| 5,574,984 A | * | 11/1996 | Reed et al. ................... | 455/69 |

OTHER PUBLICATIONS

T1A/E1A/IS–95A, Mobile Station—Base Station Compatibility Standard for Dual–Mode Wideband Spread Spectrum Cellular System, May 1995, p. 66–6, 7–13, 7–14, 7–15.

Performance Improvement of Closed–Loop Power Control in CDMA Cellular Mobile Communication Systems, by Qiang Shen and Witold A. Krzymien, IEEE Conference on Vehicular Technology, VTC'96, Atlanta, May, 1996, p. 56–60.

Digital Signalling Over a Bandwidth–Constrained Linear Filter Chanel by J.G. Proakis, Digital Communications McGraw Hill, 1989, p. 561–567.

Effects of Diversity, Power Control, and Bandwidth on the Capacity of Microcellular CDMA Systems by Ahmad Jalali and Paul Mermelstein, IEEE Journal on Selected Areas in Communications vol. 12. No. 5 Jun. 1994 p. 952–961.

Signal and Interference Statistics of a CDMA System with Feedback Power Control by Sirikiat Ariyavisitakul and Li Fung Chang, IEEE Transactions on Communications, vol. 41, No. 11, Nov. 1993 p. 1626–1634.

Multipath Interference by W.C. Jakes, Microwave Mobile Communications, New York, Wiley, 1974, p. 11–79.

* cited by examiner

Primary Examiner—Vu Le
(74) Attorney, Agent, or Firm—Davis & Bujold, P.L.L.C.

(57) ABSTRACT

In a wireless terminal used in a telecommunications system in which control bits are sent from a base station to a wireless terminal (mobile station) to control the transmitted power of the wireless terminal, a (linear) predictor is used at the wireless terminal to predict the accumulation of the received power control bits received by the mobile station, and use the difference of two successive predictor outputs to adjust the output power of the mobile in a multi-level (or continuous) increments fashion.

12 Claims, 1 Drawing Sheet

CLOSED LOOP POWER CONTROL SCHEME FOR WIRELESS COMMUNICATION SYSTEMS

FIELD OF THE INVENTION

This invention relates to power control systems for wireless terminals.

BACKGROUND OF THE INVENTION

For the reverse link of the CDMA cellular system defined by IS-95 standard, a closed-loop power control scheme is used to maintain the uniform received signal power at the base station receiving antenna. Based on the measurement of the received signal energy at the base station, the base station sends back power control bit streams at 800 bits/second rate. The mobile station adjusts the transmission power up or down a fixed power step according to the power control bit. Due to the impairments in the power control bits transmission and generation (errors and delay), this power control scheme still results in non-negligible variation in receiving power at the base station in the presence of channel fading and shadowing, thus affecting the overall system performance.

SUMMARY OF THE INVENTION

Since the closed-loop power control is mainly for compensation of the small scale fading caused by the moving of the vehicle in which the mobile station is installed, and the Doppler spread of the fading is relatively small compared to the power control bit rate, the inventors proposes using the correlation of channel gains between successive power control groups to relieve the impact of the impairments in the power control bit transmission and generation.

In this proposal, a (linear) predictor is used to predict the accumulation of the received power control bits received by the mobile station, and use the difference of two successive predictor outputs to adjust the output power of the mobile in a multi-level (or continuous) increments fashion.

In one aspect of the invention, there is provided a wireless terminal for use in a communications system using a power control bit channel, comprising:

a receiver tunable to the power control bit channel, the receiver having, in operation, a received signal as output;

an accumulator for accumulating the output of the receiver to produce an accumulated signal;

a predictor having as input the accumulated signal and output a prediction of future values of the accumulated signal;

a power controller having as input the output from the predictor and having as output a signal whose power is a function of the predictor output; and a transmitter for transmitting signals having a power that is a function of the predictor output.

In a further aspect of the invention, there is provided a method of controlling power of transmitted signals exchanged between first and second wireless terminals, the method comprising the steps of:

an accumulating in an accumulator a received signal to produce an accumulated signal;

predicting in a predictor future values of the accumulated signal; and controlling the power of a signal transmitted by the wireless terminal based on a function of the future values output from the predictor.

Preferably, a differential decoder is located between the predictor and the power controller, so that the function of the future values is a function of the difference between successive future values of the output from the predictor. Preferably, the predictor is reset when the difference between successive outputs from the predictor exceeds a given value. The function of the future values may be a discontinuous or continuous function. A preferred implementation of the predictor includes time variable tap weight coefficients and the predictor implements a Widrow least mean square algorithm to recursively adjust the tap weight coefficients.

These and other aspects of the invention are described in the detailed description of the invention and claimed in the claims that follow.

BRIEF DESCRIPTION OF THE DRAWINGS

There will now be described preferred embodiments of the invention, with reference to the drawing, by way of illustration only and not with the intention of limiting the scope of the invention, in which the FIGURE shows a schematic of an embodiment of a power control scheme according to the invention.

DETAILED DESCRIPTION OF PREFERRED EMBODIMENTS

Figure 1:
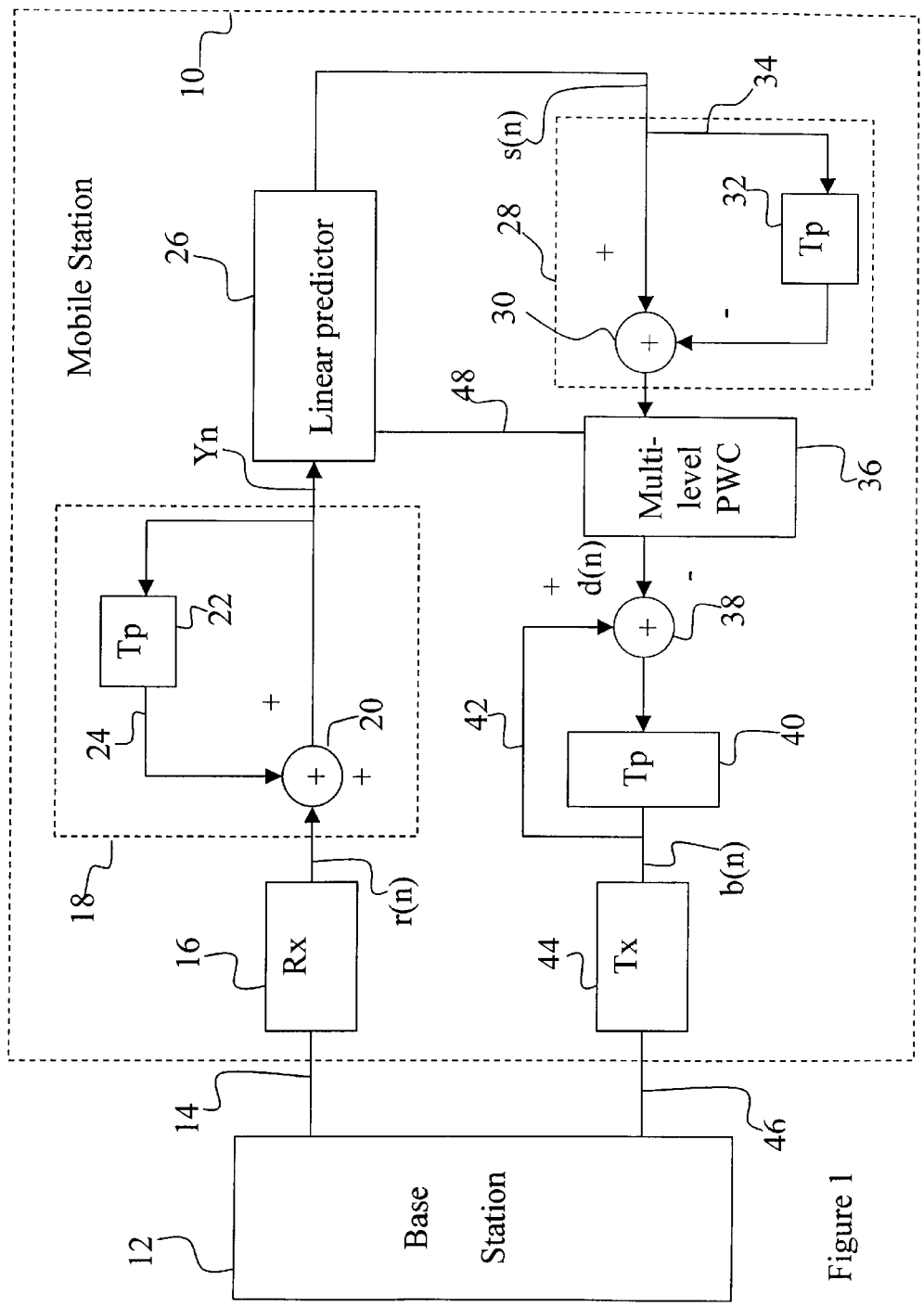

FIG. 1 depicts the operation of an embodiment of the improved power control scheme. A wireless terminal or mobile station 10 is linked to a base station 12 by a communications channel 14 a portion of which is set aside for power control bits. Both the wireless terminal 10 and base station 12 are conventionally made in accordance with TIA/EIA/IS-95, Mobile Station-Base Station Compatibility Standard for Dual-Mode Wideband Spread Spectrum Cellular System, May 1995, and communicate according to this standard. While the base station 12 would normally be fixed, the invention may also work if power control bits are sent from another wireless terminal. The wireless terminal 10 includes a receiver 16 tunable to the power control bit channel and having a received signal r(n) as output. r(n), the received power control bit, includes error and delay introduced during the transmission of the power control bit from the base station 12. The receiver 16 is also conventional and may include for example a demodulator, sampler and AtoD converter and other conventional elements used in wireless terminal receivers. It should be appreciated that while the receiver has been shown schematically before accumulator 18, some elements of the receiver 16 may be distributed after the accumulator 18. Following the receiver is the accumulator 18 which accumulates the output r(n) of the receiver 16 to produce an accumulated signal v(n). The accumulator 18 includes a summer 20 and delay 22 on feedback line 24, whose delay $T_p$ is equal to the sampling period for the control bits, typically in the order of 1.25 ms. Connected to the output from the accumulator 18 is a predictor 26, whose output s(n) is a prediction of future values of the accumulated signal v(n). Following the predictor 26 is a differential decoder 28 whose input is the predicted values s(n) and whose output is the difference s(n)−s(n−1) between successive values of the predicted output of the accumulator 18. Differential decoder 28 is formed of a summer 30 whose inputs are the signal s(n) at a time instant n and the negative of the immediately preceding value s(n−1) that has been delayed by one sampling period $T_p$ by delay 32 on line 34.

Following the differential decoder 28 is a power controller 36 whose input is the output from the predictor 26 that has passed through the differential decoder 28. The output of the power controller 36 is a signal d(n), the actual power control step, whose power is a function of the predictor output s(n). Following the power controller 36 is a summer 38 that, together with delay 40 and feedback line 42 increases or decreases the transmitted power b(n) according to the relation b(n+1)=b(n)−d(n). Following the summer 38 is a conventional transmitter 44 for transmitting signals having a power that is a function of the predictor output along the reverse communication channel 46.

At the mobile station, the received power control bits r(n) (with delay and error) are accumulated, before being fed into a (linear) predictor 26. The objective of the predictor 26 is to compensate for the delay and correct the error in the power control bit generation and transmission. The output s(n) of the predictor 26 is passed through the differential decoder 28 to recover the form of power control bit, a multi-level mapping of this output decides the actual power adjustment of the mobile station. The mapping can be multi-level (discontinuous as shown below) or continuous, one example of the mapping is:

$$d(n) = \begin{cases} 0 & |s(n)-s(n-1)| < 0.5 \\ \pm\Delta & 0.5 \leq |s(n)-s(n-1)| < 1.5 \\ \pm 2\Delta & 1.5 \leq |s(n)-s(n-1)| \leq 3 \\ 0 & 3 < |s(n)-s(n-1)| \end{cases} \quad (1)$$

$\Delta$ is the nominal power control step as defined in IS-95 (0.5 dB or 1 dB). A continuous function would be of the form $d(n)=\Delta f(s(n)-s(n-1))$. For example f could be defined as $f(x)=x$ when $|x|<X$ and $f(x)=0$ when $|x|\geq X$, where X is a pre-determined threshold for re-setting the predictor 26 (for example 3 dB).

The predictor 26 is designed to be adaptive, as the channel characteristics are changing. To reduce negative impact of the predictor 26 divergence, whenever the difference of the predictor output is larger than a threshold, the actual power control ignores its output, as shown in equation (1). At the same time the predictor 26 is reset by a signal sent along line 48, and the adaptation re-starts.

The adaptation of the predictor can be any algorithm which minimizes the error between desired power control bits and received power control bits with delay and error. A simple application is the LMS (least-mean-square) Widrow algorithm as described in J. G. Proakis, Digital Communications, McGraw Hill, 1989, at pages, 561–567, the content of which is herein incorporated by reference. The algorithm may be written as:

$$C(n+1)=C(n)+\Delta e(n)V(n)$$

where $C[n]=[C(n)_0, C(n)_1 \ldots C(k)_p]$ is the time variable predictor coefficients vector with length p at time instant n, $V(n)=[V(n), V(n-1), \ldots V(n-p)]$ is the input vector formed of the accumulated signal at time instant n, $\Delta$ is the nominal power adaptation step, and $e(n)=u(n)-C(n)\bullet V(n)^T$ is the prediction error, in which u(n) is the desired output of the predictor at time instant n and • is the dot product. When u(n) can be obtained, it is the noiseless version of $V(n+\zeta)$ for $\zeta$-step prediction. With the difficulty of obtaining the immediate desired power control bits $u(+\zeta)$, the prediction error can be formed either by inserting in the power control channel regularly a small burst of power control bits with higher redundancy, or by estimating from the history of the received power control bits. One simple example for the second method is: $e(n-1)=r(n)+r(n-1)/2+r(n-2)+r(n-3)/2k$ (2) where e(n−1) is the error at instant (n−1), r(n) is the received power control bit at instant n, k>1 is a real number. The output of the predictor 26 is therefore $s(n)=C(n)\bullet V(n)^T$. C(n) is temporarily stored and updated each time instant n, n+1 etc in the predictor 26 in conventional fashion, while the input vector V(n) is likewise stored temporarily and updated using for example shift registers. An example of a linear adaptive equalizer implementing the Widrow algorithm is shown at p. 567 of Proakis.

One advantage of the proposed scheme is that with the multi-level mapping of the predictor output, it is possible to reduce the variation of power when power level is satisfactory, in contrast to the conventional method where the power level will zigzag up and down one nominal step even when the power level is satisfactory; on the other hand the possibility of large step of power change provided by the multi-level mapping enables rapid power adjustment to the required level whenever necessary.

A second advantage comes from the fact that the predictor 26 uses only the accumulation of the received power control bits as its input, and all the operations are in the mobile station, so the power control air interface is unchanged, and this scheme can be still applicable in the future with the modified air interface.

Simulation of the proposed scheme has shown that for full data rate application, for a typical fading channel caused by moving of mobile with speed from 1 km/h to 120 km/h, the maximum performance improvement to the overall system frame error rate is equivalent to 1 dB signal to interference ration gain (at the average Eb/(NO+I0)=6 dB). This implies an increase of system capacity by up to 25% in the system with all mobiles employing the proposed scheme. Further analysis of the performance of the proposed power scheme and simulation results are found in Qiang Shen, Witold A. Krzymien, "Performance improvement of closed-loop power control in CDMA cellular mobile communication systems", IEEE Conference on Vehicular Technology, VTC'96, Atlanta, May 1996, the content of which is herein incorporated by reference.

To obtain the expected performance, the adaptation of the predictor should be fast enough to follow the change of the channel condition. However, this may increase the probability of predictor instability, so a trade-off is needed in system parameters' selection. The increase of the following parameters will increase predictor tracking speed, but at the same time increase the possibility of predictor divergence:

1. predictor tap weights adaptation step;
2. power control nominal step (or maximum actual power control step in multi-level mapping).
3. length of the predictor.

To avoid the negative impact of the predictor divergence, it is preferred that when the difference of the predictor output is larger than a threshold, the actual power control ignore this output (as illustrated in equation (1)), at the same time the predictor is reset (the initial tap weight is reset to [1,0, . . . 0] for a linear predictor).

A regular reset of the predictor is recommended also from the consideration that an accumulation of the power control bit error will result in a constant error (DC component) in the predictor input, which will affect the performance of the predictor.

When the predictor is reset, no performance degradation is introduced compared to the conventional scheme and before the proposed scheme recovers its operation (that is, until the accumulator accumulates several received power control bits) the system actually works in a manner similar to the manner of conventional schemes. After adaptation over several power control groups, the proposed scheme recovers its operation (and provides improved performance).

The proposed power control scheme can be incorporated into signal processing ASICs in the mobile station, with no specific modification needed in the mobile station architecture.

The proposed scheme is expected to have a better performance when the level of actual power control is increased. The mapping can even be a continuous mapping (the actual power is controlled continuously).

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. A wireless terminal for use in a communications system using a power control bit channel, comprising:
    a receiver tunable to the power control bit channel, the receiver having, in operation , a received signal as output, wherein the received signal comprises power control bits;
    an accumulator for accumulating the output of the receiver to produce an accumulated signal;
    a predictor having as input the accumulated signal and output a prediction of future values of the accumulated signal;
    a power controller having as input the output from the predictor and having as output a signal whose power is a function of the predictor output; and
    a transmitter for transmitting signals having a power that is a function of the predictor output.

2. The wireless terminal of claim 1 further including a differential decoder between the predictor and the power controller.

3. The wireless terminal of claim 2 further including means to reset the predictor when the difference between successive outputs from the predictor exceeds a given value.

4. The wireless terminal of claim 3 in which the power controller controls the power of the transmitted signal according to a discontinuous function.

5. The wireless terminal of claim 3 in which the power controller controls the power of the transmitted signal according to a continuous function.

6. The wireless terminal of claim 1 in which the predictor includes time variable tap weight coefficients and the predictor implements a Widrow least mean square algorithm to recursively adjust the tap weight coefficients.

7. A method of controlling power of transmitted signals exchanged between first and second wireless terminals, the method comprising the steps of:
    accumulating in an accumulator a received signal to produce an accumulated signal, wherein the received signal comprises power control bits;
    predicting in a predictor future values of the accumulated signal; and
    controlling the power of a signal transmitted by the wireless terminal based on a function of the future values output from the predictor.

8. The method of claim 7 in which the function of the future values is a function of the difference between successive future values of the output from the predictor.

9. The method of claim 8 further including the step of resetting the predictor when the difference between successive outputs from the predictor exceeds a given value.

10. The method of claim 8 in which the function of the future values is a discontinuous function.

11. The method of claim 8 in which the function of the future values is a continuous function.

12. The method of claim 7 in which the predictor includes time variable tap weight coefficients and the predictor implements a Widrow least mean square algorithm to recursively adjust the tap weight coefficients.

* * * * *